United States Patent [19]

Ichiura et al.

[11] Patent Number: 5,586,095
[45] Date of Patent: Dec. 17, 1996

[54] ULTRA-RESOLVING OPTICAL PICKUP DEVICE HAVING AN OPTICAL DETECTOR RECEIVING AN UNFILTERED REFLECTED BEAM

[75] Inventors: Shuichi Ichiura, Hashima; Osamu Ota, Ibi-gun, both of Japan

[73] Assignee: Sanyo Electric Co., Inc., Japan

[21] Appl. No.: 251,579

[22] Filed: May 31, 1994

[30] Foreign Application Priority Data

May 31, 1993 [JP] Japan .................................. 5-154274

[51] Int. Cl.⁶ ..................................... G11B 7/095
[52] U.S. Cl. ........................................ 369/44.24; 369/112
[58] Field of Search ................ 369/44.12, 44.23–44.24, 369/44.37, 44.41, 112, 120

[56] References Cited

FOREIGN PATENT DOCUMENTS 4125826  4/1992  Japan .

OTHER PUBLICATIONS

Patent Abstracts of Japan, vol. 16, No. 390, P. 1405, Aug. 19, 1992, & JP4-125826.
Patent Abstracts of Japan, vol. 17, No. 299, P1552, Jun. 8, 1993 & JP5-20697.
Patent Abstracts of Japan, vol. 16, No. 562, P1456, Dec. 3, 1992 & JP4-216342.
H. Osterberg et al., "The Resolving Power of a Coated Objective" *Journal of the Optical Society of America*, vol. 39, No. 7, Jul. 1949 pp. 553–557.
J. E. Wilkins, Jr., "The Resolving Power of a Coated Objective II", *Journal of the Optical Society of America*, vol. 40, No. 4, Apr. 1950 pp. 222–224.

*Primary Examiner*—W. R. Young
*Attorney, Agent, or Firm*—Michaelson & Wallace; Peter L. Michaelson; John C. Pokotylo

[57] ABSTRACT

An optical pickup device provides an ultraresolving prism between a semiconductor laser and an objective lens so as to reduce light intensity at around a cross sectional center of a laser beam, thereby generating ultraresolution thereon. An optical detector is disposed at a signal detecting position where the laser beam reflected by an optical disk is converged. The optical detector has a detecting element for receiving a main lobe and a pair of detecting elements for receiving a pair of side lobes. A peak of a shielding portion of the prism is inclined to a track center of the optical disk so that the side lobes are oppositely shifted from the track center. Thus, tracking error signals are obtained on the basis of detected signals in the side lobes.

1 Claim, 6 Drawing Sheets

ULTRA-RESOLVING OPTICAL PICKUP DEVICE HAVING AN OPTICAL DETECTOR RECEIVING AN UNFILTERED REFLECTED BEAM

BACKGROUND OF THE INVENTION

1. Field of the Invention

This invention relates to an optical pickup device, and more particularly, to an optical pickup device that uses ultra-resolution to lessen a spot size of a laser beam which is converged on an optical disk.

2. Description of the Related Art

An optical pickup that uses ultra-resolution to lessen a spot size of a laser beam which is converged on an optical disk is known. This pickup generates the ultra-resolution by a device that decreases light intensity at around a center portion, in cross section, of the laser beam. By the ultra-resolution, the laser beam is divided into a main lobe and a pair of side lobes which are positioned at both sides of the main lobe, and converged on the optical disk through an objective lens. As shown in FIG. 7, a minor axis (i.e., the width) of the main lobe is smaller than that of a normal laser beam (shown by the dashed lines), and relatively intense side lobes are produced at both sides thereof. The ultra-resolution is known, and disclosed in some publications: H. Ostenberg and J. E. Wilkins, "The resolving power of a coated objective," J. Opt. Soc. Am., 39 (1949) p553–557, and J. E. Wilkins "The resolving power of a coated objective II," J. Opt. Soc. Am., 40 (1950) p222–224.

FIG. 8 is a schematic drawing showing, as an example, an optical pickup device utilizing ultra-resolution.

Referring to FIG. 8, an outgoing beam out of a semiconductor laser 51 is collimated into parallel rays through a collimator lens 52. The collimated beam passes a beam shaping prism 53, first and second beam splitters 54 and 55, respectively, a quarter wavelength plate 56 and an objective lens 57, thereby being applied to an optical disk 100. A band-shaped light shielding plate 58 is disposed between the beam shaping prism 53 and the first beam splitter 54. The light shielding plate 58 decreases light intensity around a cross sectional center of the laser beam so as to generate ultra-resolution, thereby lessening a spot size of the laser beam converged on the optical disk 100.

The laser beam is reflected on the optical disk 100 and goes through the quarter wavelength plate 56. Then, part of the laser beam is reflected by the second beam splitter 55 and converged in a slit 63 of a slit plate 62 through a converging lens 61. The slit 63 cuts off side lobes in the reflected laser beam so that a first optical detector 64 receives only a main lobe (reproduced signal component). Thus, signal components of the side lobes are removed since they are unnecessary.

On the other hand, part of the laser beam going through the second beam splitter 55 is reflected by the first beam splitter 54. Then, the reflected laser beam is condensed through a second converging lens 71, and directed to and received by a detecting system for focusing error and tracking error signals. Namely, part of the laser beam from the second converging lens 71 passes through a third beam splitter 72 and converged on a second optical detector 73 that outputs detection signals. Focusing error signals are produced based on the detection signals from the second optical detector 73. The rest of the laser beam is converged on a third optical detector 75 that outputs detection signals.

Tracking error signals are produced based on detection signals from the third optical detector 75.

Japanese Patent Publication (Kokai) No. 4-125826 discloses an optical pickup device having a similar structure to that of the device of FIG. 8. This device has a mirror on an upper surface of a member corresponding to the slit plate 62 of FIG. 8, to reflect side lobes, and directs these side lobes to a detecting system for focusing error signals.

Unfortunately, with the above two optical pickup devices, the slit plate 62 may cut off necessary components in the main lobe, thereby deteriorating a S/N ratio of the reproduced signals.

Moreover, with the above two optical pickup devices, the slit plate 62 must be very accurately disposed at a predetermined position in order to pass the main lobe through the slit 63, thereby necessitating a positioning work with high accuracy and taking much labor.

SUMMARY OF THE INVENTION

In view of the above problems with known ultra-resolution optical pickup devices, it is an object of the invention to provide an optical pickup device that does not need a slit for removing side lobes and optimally uses signal components of a main lobe, thereby improving a S/N ratio of detected signals, while utilizing ultra-resolution.

One preferred mode of the invention provides an optical pickup device that comprises: a laser source; an objective lens converging a laser beam radiated from the laser source on an optical disk surface; a light reducing means, disposed between the laser source and the objective lens, for reducing light intensity of the laser beam at around its cross sectional center so as to separate the laser beam converged on the optical disk surface into a main lobe and a pair of side lobes placed at both sides of the main lobe, the light reducing means being positioned so that the objective lens converges the main lobe therefrom on a track composed of a line of pits while converging the side lobes at positions oppositely shifted from a track center by a predetermined amount in a track pitch direction; a first optical detecting means, disposed at a converging point of the laser beam reflected by the optical disk surface, for receiving the reflected laser beam through the objective lens, the first optical detecting means receiving the main lobe in the reflected laser beam so as to detect signals corresponding to information stored in the optical disk; and a second optical detecting means, disposed at a converging point of the laser beam reflected by the optical disk surface, for receiving the reflected laser beam through the objective lens, the second optical detecting means including a pair of detecting elements for receiving the side lobes in the reflected laser beam so as to detect tracking error signals.

Further objects and advantages of the invention will be apparent from the following description, wherein preferred embodiments of the invention are clearly shown.

BRIEF DESCRIPTION OF THE DRAWINGS

The subject matter regarded as the invention is set forth in the appended claims. The invention itself, however, together with further objects and advantages thereof, may be better seen in reference to the following description taken in connection with the accompanying drawings.

FIG. 2 (a) shows a side view of the ultra-resolving prism, FIG. 2 (b) shows a main lobe and a pair of side lobes formed on an optical disk surface by the ultra-resolving prism, and FIG. 2 (c) shows a plan view of the ultra-resolving prism.

FIG. 3(a) shows a positional relationship when a peak of a light shielding portion of an ultra-resolving prism is disposed at right angles to a track direction, FIG. 3(b) shows a positional relationship when the peak of the light shielding portion of the ultra-resolving prism is disposed at a predetermined angle to the track direction, and FIG. 3(c) shows a positional relationship when the peak of the light shielding portion of the ultra-resolving prism is disposed at another predetermined angle larger than the angle of FIG. 3(b) to the track direction.

DESCRIPTION OF PREFERRED EMBODIMENTS

Figure 1:
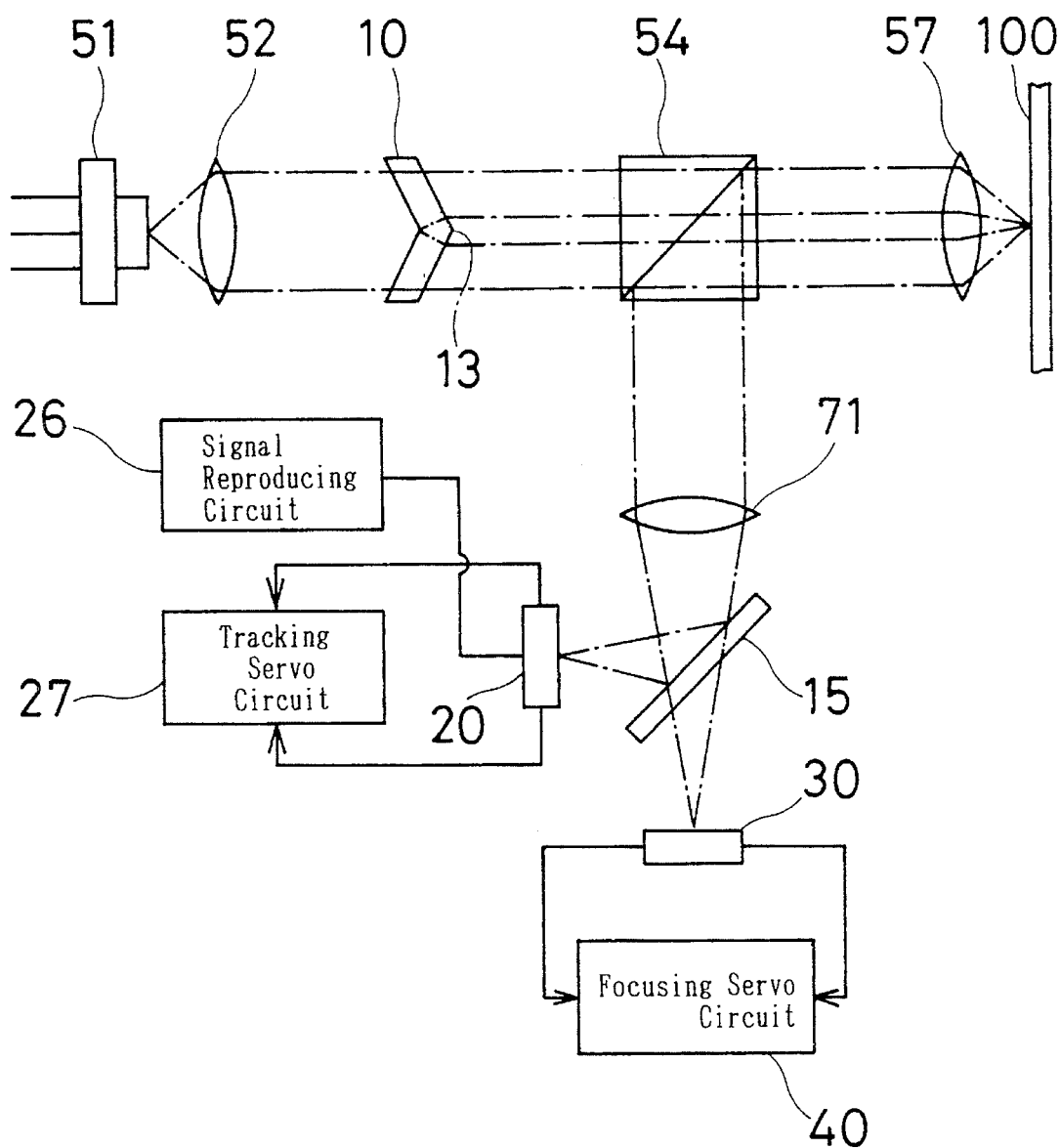
FIG. 1 is a schematic of an optical system of one embodiment of an optical pickup device of the invention.

Referring to the drawings, wherein like reference characters designate like or corresponding parts throughout the several views, one preferred mode of an ultra-resolution system of the invention will be described hereafter.

FIG. 1 is an explanatory drawing showing an optical system of one embodiment of an optical pickup device of the invention.

Referring to FIG. 1, an optical system of one embodiment of the inventive optical pickup device includes a semiconductor laser 51 as a laser source, a collimator lens 52, a beam splitter 54 and an objective lens 57, as the device of related art. An ultra-resolving prism 10 is disposed as a light reducing means between the collimator lens 52 and the beam splitter 54. Details of the prism 10 will be described later. The semiconductor laser 51, collimator lens 52, ultra-resolving prism 10, beam splitter and objective lens 57 are coaxially arranged along an optical axis of the laser beam, so as to converge and irradiate the laser beam on a track defined by a line of pits of an optical disk 100. A converging lens 71 is disposed at one side of the beam splitter 54 so that the beam splitter 54 reflects and directs the laser beam, containing signal components reflected from the track surface of the optical disk 100, toward the converging lens 71.

A plane parallel plate half mirror 15 is arranged at one side of the converging lens 71 away from the beam splitter 54 at an angle to an optical axis of the laser beam from the lens 71. A first optical detector 20 is disposed, as a reproduced signal detecting means and a tracking error signal detecting means, at one side of the half mirror 15. A second optical detector 30 is disposed, as a focusing error signal detecting means, at the other side of the half mirror 15. Part of the laser beam from the converging lens 71 is reflected by the half mirror 15 in a direction substantially perpendicular to the optical axis of the converging lens 71 and directed to the first optical detector 20. The rest of the laser beam is transmitted through the half mirror 15 and directed to the second optical detector 30.

The first optical detector 20 is connected to a signal reproducing circuit 26 and a tracking servo circuit 27. The second optical detector 30 is connected to a focusing servo circuit 40. The first and second detectors 20 and 30, respectively, signal reproducing circuit 26, tracking servo circuit 27 and focusing servo circuit 40 will be described in detail below.

Figure 2B:
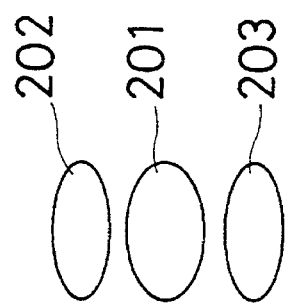
FIGS. 2 (a), 2 (b) and 2 (c) are explanatory drawings showing an ultra-resolving prism used in one embodiment of an optical pickup device of the invention and illustrating its operation.
Figure 2A:
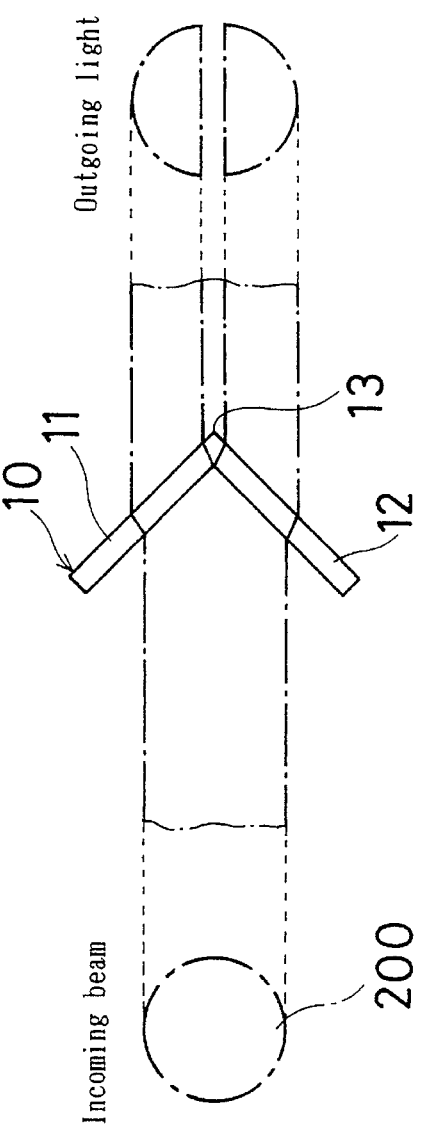
Figure 2C:
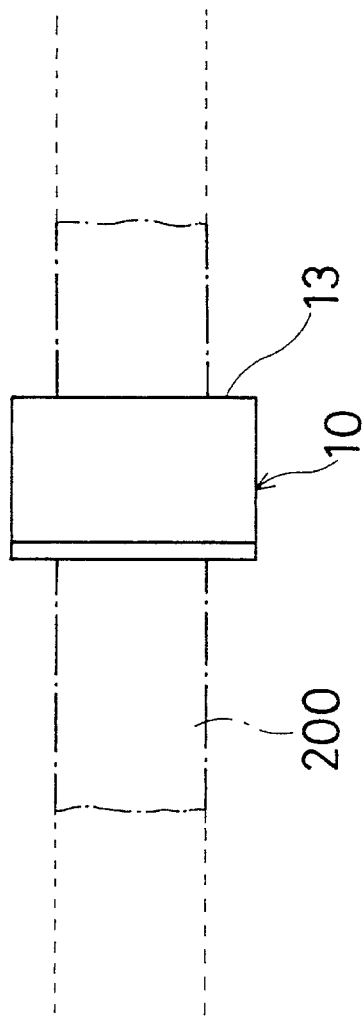

Next, the ultra-resolving prism 10 is described in detail. FIGS. 2(a), 2(b) and 2(c) are explanatory drawings respectively showing an ultra-resolving prism 10 used in one embodiment of an optical pickup device of the invention, while illustrating its operation. FIG. 2(a) shows a side view of the ultra-resolving prism, FIG. 2(b) shows a main lobe and a pair of side lobes formed on an optical disk surface by the ultra-resolving prism, and FIG. 2(c) shows a plan view of the ultra-resolving prism.

Referring to FIGS. 2(a), 2(b) and 2(c), the ultra-resolving prism 10 is made of two glass plates 11 and 12 with their ends abutted and joined to each other into an angle plate. The plates 11 and 12 are joined at a predetermined angle to define a corner part as a light shielding portion 13. Namely, as shown in FIGS. 2 (a) and 2 (c), the ultra-resolving prism 10 is disposed on an optical axis of a laser beam 200, that is shaped into a circular cross section by the collimator lens 52, while a peak of the shielding portion 13 defines a line perpendicular to the optical axis of the laser beam 200. Thus, as shown in FIG. 2(b), the shaped laser beam 200 is vertically divided at its center line through the shielding portion 13 of the prism 10 and then diffracted, thereby decreasing light intensity at the central portion of the laser beam 200 so as to generate ultra-resolution. As a result, when the laser beam is converged and irradiated on the signal surface of the optical disk 100 from the prism 10 through the objective lens 57, it is separated into a large elliptic main lobe 201 corresponding to the shielding portion 13 and a pair of small elliptic side lobes 202 and 203 that are positioned at both sides of the main lobe 201.

Figure 3A:
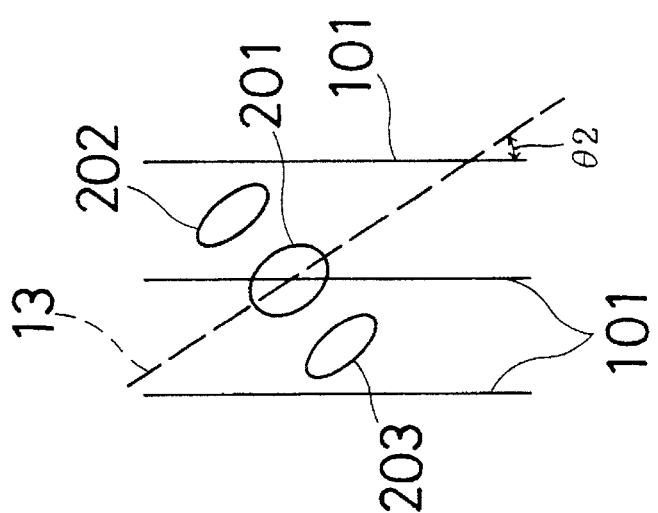
FIGS. 3(a), 3(b) and 3(c) are explanatory drawings showing positional relationships between laser spots and a track on an optical disk in one embodiment of an optical pickup device of the invention.
Figure 3B:
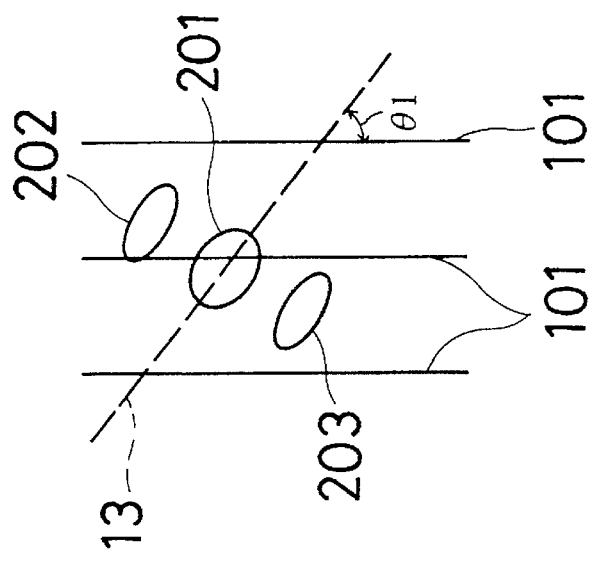
Figure 3C:
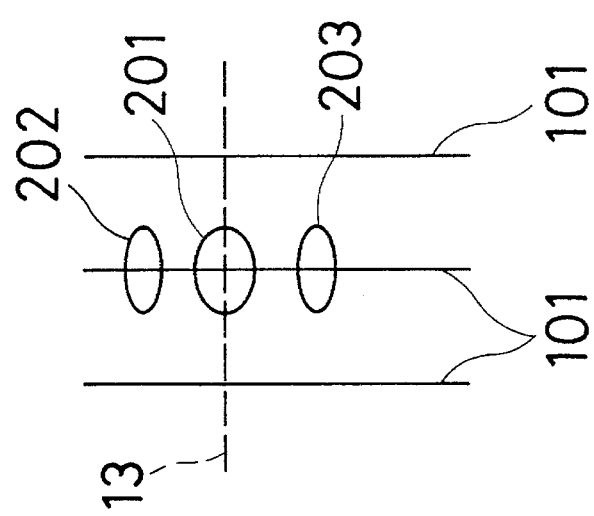

FIGS. 3(a), 3(b) and 3(c) are explanatory drawings respectively showing positional relationships between laser spots and a track on an optical disk in one embodiment of an optical pickup device of the invention. FIG. 3(a) shows a positional relationship when a peak of a light shielding portion of an ultraresolving prism is disposed at right angles to a track direction, FIG. 3(b) shows a positional relationship when the peak of the light shielding portion of the ultra-resolving prism is disposed at a predetermined angle to the track direction, and FIG. 3(c) shows a positional relationship when the peak of the light shielding portion of the ultra-resolving prism is disposed at another predetermined angle larger than the angle of FIG. 3(b) to the track direction.

Figure 7:
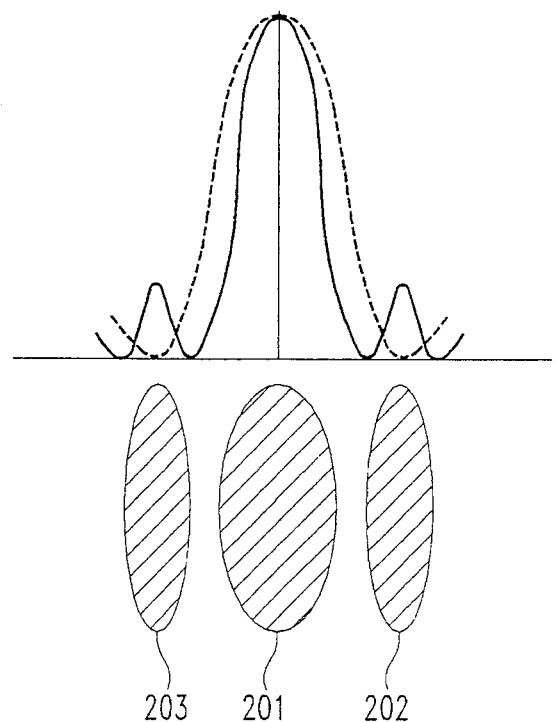
FIG. 7 is a graph showing laser spots and a laser intensity in ultra-resolution.
Figure 8:
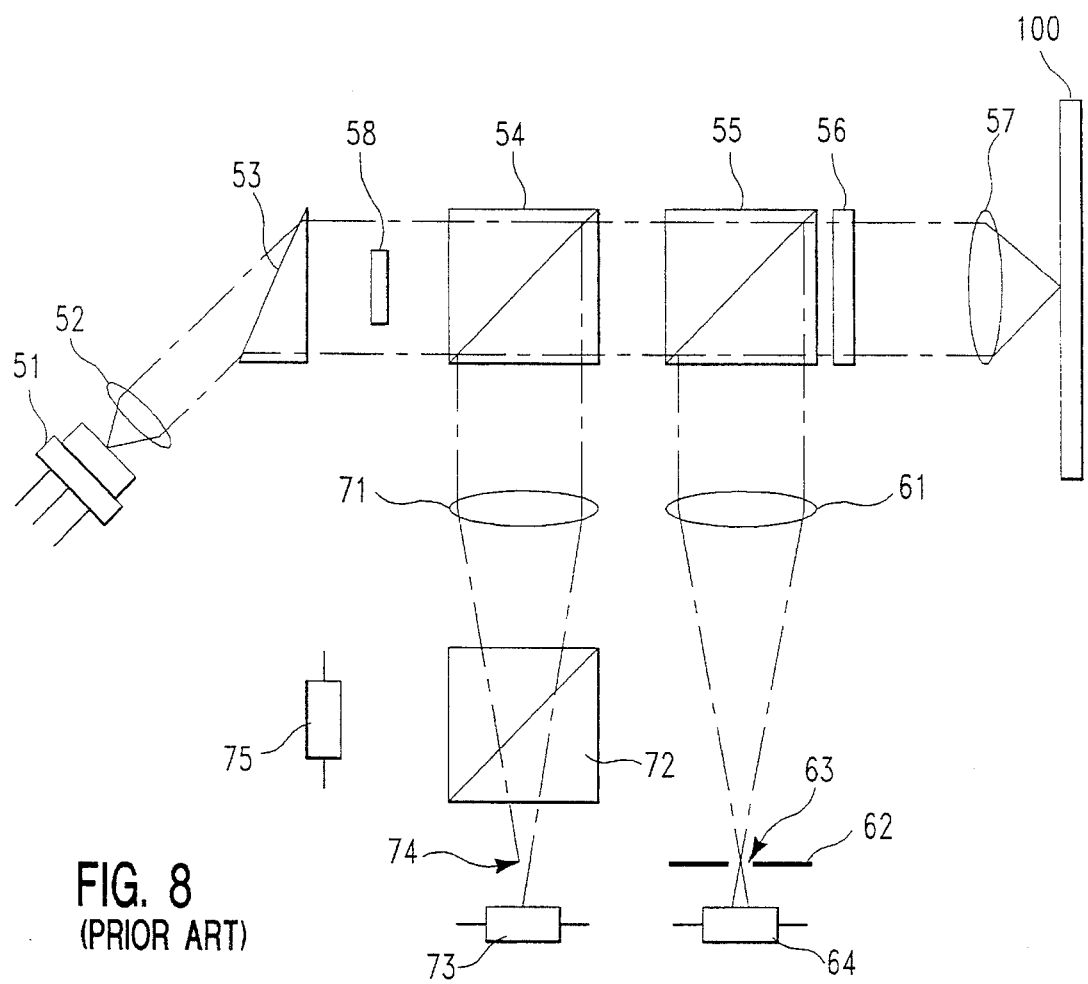
FIG. 8 is a schematic drawing showing an optical system of a known optical pickup device.

As shown in FIG. 7, the shaped laser beam 200 is transmitted through the beam splitter 54 and converged on the optical disk 100 by the objective lens 57 in the form of the main lobe 201 and the side lobes 202 and 203. The main lobe 201 is irradiated on the track of the disk 100 with a smaller spot size than a spot size of a normal laser beam. As shown in FIGS. 3(a), 3(b) and 3(c), positions of the side lobes 202 and 203 on the disk 100 are determined by an angle between the peak of the light shielding portion 13 of the prism 10 and a track center 101. Namely, the peak of the light shielding portion 13 defines a line perpendicular to the optical axis of the laser beam 200 from the semiconductor laser 51 and is therefore parallel to the surface of the optical disk 100. The prism 10 is rotated in a plane perpendicular to the optical axis of the laser beam 200 while it remains parallel to the optical disk 100 surface, as shown in FIGS. 1, 2(a) and 2(c), to change the crossing angle of the peak of the shielding portion 13 to the track center 101. For example, as shown in FIG. 3(a), when the peak of the light shielding portion 13 is oriented at right angles to the track center 101, both the side lobes 202 and 203 as well as the main lobe 201 are disposed on the track center 101. If the peak of the light shielding portion 13 is oriented at a predetermined angle θ1 to the track center 101, as shown in FIG. 3(b), the main lobe 201 is disposed on the track center 101, and the side lobes 202 and 203 are placed respectively at positions oppositely shifted from the track center 101 by a predefined amount in a track pitch direction. If the peak of the light shielding portion 13 is oriented at a predetermined angle θ2 larger than the angle θ1 to the track center 101, as shown in FIG. 3(c), the main lobe 201 is disposed on the track center 101, and the side lobes 202 and 203 are placed respectively at positions oppositely shifted from the track center 101 by a predefined amount in the track pitch direction larger than the shifted amount in the case of FIG. 3(b).

In this embodiment, the angle between the peak of the light shielding portion 13 and track center 101 is set so that the main lobe 201 is irradiated on the track center 101 of the disk 100, and the side lobes 202 and 203 are irradiated on positions shifted by a quarter track pitch from the track center 101, respectively as a main spot and subspots in the conventional three spot method.

Figure 4:
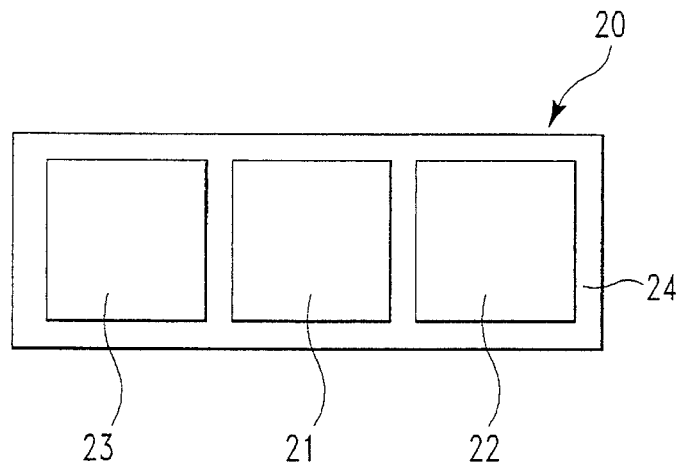
FIG. 4 is a schematic drawing showing an optical detector used in one embodiment of an optical pickup device of the invention.

Next, the first optical detector 20 is described in detail hereunder. FIG. 4 is a schematic drawing showing an optical detector 20 used in one embodiment of an optical pickup device of the invention.

Referring to FIG. 4, the first optical detector 20 is adapted to detect a reflected laser beam from the half mirror 15. The first detector 20 has a first detecting element 21 for detecting the main lobe 201, a second detecting element 22 for detecting one side lobe 202 and a third detecting element 23 for detecting the other side lobe 203. The detecting elements 21–23 are arranged on a base plate 24 to form one body. Each detecting element 21, 22, 23 itself may be constituted by a conventional photoelectric transducer.

Figure 5:
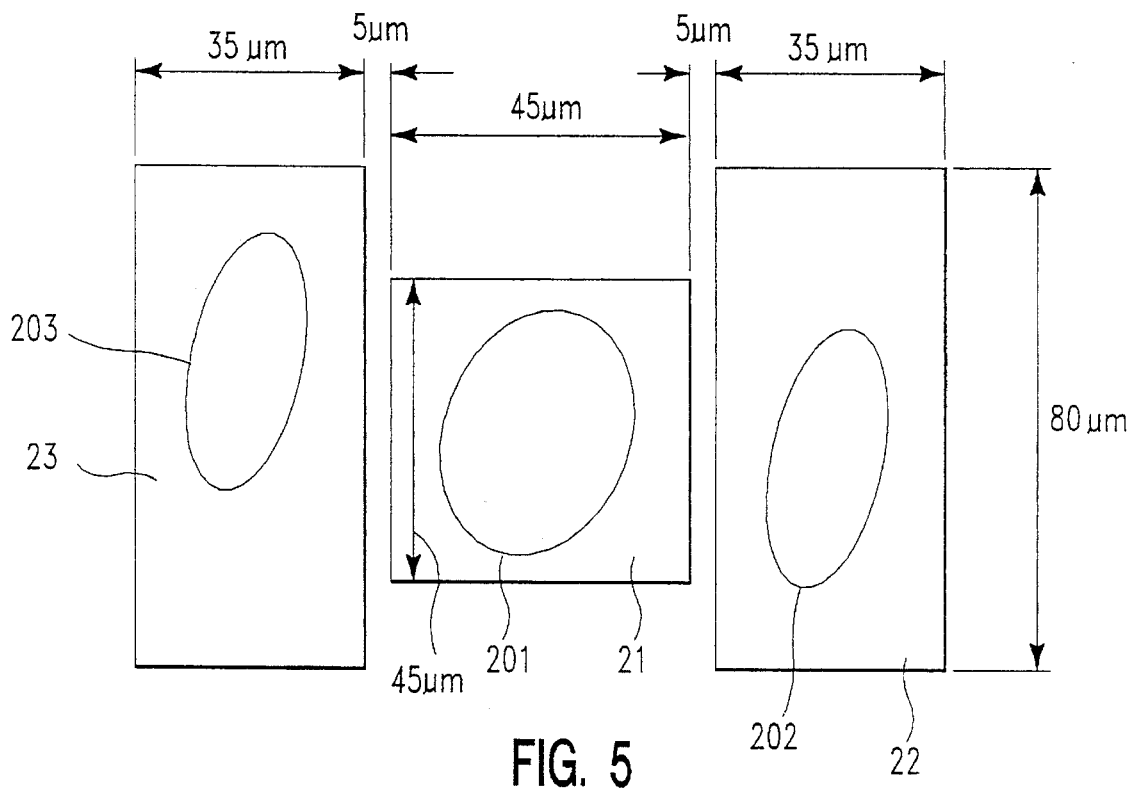
FIG. 5 is an explanatory drawing showing a size of an optical detector used in one embodiment of an optical pickup device of the invention.

A size of the first detector 20, particularly sizes of the first to third elements 21, 22 and 23 are determined according to the spot size of the detected laser beam. FIG. 5 is an explanatory drawing showing a size of an optical detector used in one embodiment of an optical pickup device of the invention.

As shown in FIG. 5, the spot sizes of the main lobe 201 and the side lobes 202 and 203 which are converged on the optical disk 100 can be obtained from a reflected beam magnified by the objective lens 57, the converging lens 71 and the like. For example, if the magnification of the optical system is set to thirty times, the sizes of the elements 21, 22 and 23 needed to detect the converged main lobe 201 and side lobes 202 and 203 are as shown in FIG. 5. Such an optical detector 20 can be easily manufactured by use of present techniques. In the figure, the dimensional units shown are in μm.

Next, a signal processing circuit, as a signal processing means, for processing detecting signals of the first optical detector 20 is described in detail hereunder.

Figure 6:
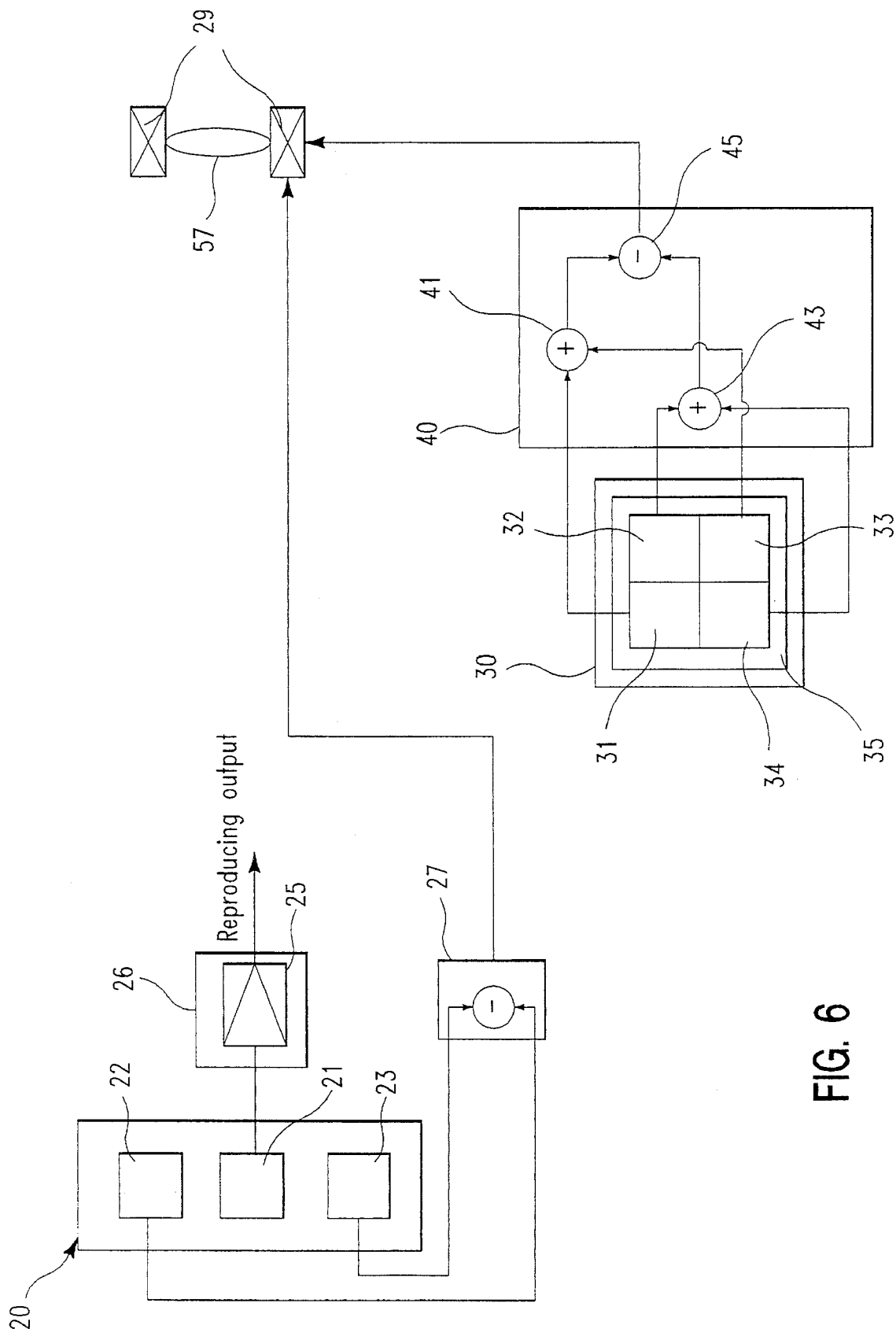
FIG. 6 is a circuit diagram of a focusing and tracking error detection device of one embodiment of an optical pickup device of the invention.

FIG. 6 is a circuit diagram for focusing and tracking error detection of one embodiment of an optical pickup device of the invention.

Referring to FIG. 6, the first detecting element 21 of the first detector 20 is connected to a conventional signal reproducing circuit 26 containing a preamplifier 25 and the like. The signal reproducing circuit 26 outputs reproducing signals corresponding to the main lobe 201 detected by the first element 21. The second and third detecting elements 22 and 23 are connected to a tracking servo circuit 27 containing a tracking error signal detecting circuit having a current-voltage transducer and a phase compensating circuit and the like. The tracking servo circuit 27 outputs tracking error signals corresponding to a difference between the side lobes 202 and 203 detected by the second and third elements 22 and 23. The output error signals of the tracking servo circuit 27 and the focusing servo circuit 40 are inputted into an actuator 29 for driving the objective lens 57, thereby controlling the actuator 29 to make the objective lens 57 follow the track center 101 of the optical disk 100. The tracking servo circuit 27 may be a conventional one used in the three spot method.

As further shown in FIG. 6, the second optical detector 30 detects the laser beam transmitted through the half mirror 15. The second detector 30 is composed of four quadrants to detect the main lobe 201: a first detecting element 31, a second detecting element 32, a third detecting element 33 and a fourth detecting element 34. The first to fourth elements 31–34 are arranged on a base plate 35 to form one body. The detecting elements 31–34 are connected to a focusing servo circuit 40 containing current voltage transducers 41 and 43, a subtracting circuit 45, a phase compensating circuit and the like. The focusing servo circuit 40 outputs focusing error signals corresponding to the main lobe 201 detected by the elements 31–34. The focusing error signals are inputted into the actuator 29, thereby controlling the actuator 29 so as to maintain a constant relative distance between the objective lens 57 and the signal surface of the optical disk 100. The second optical detector 30 and the focusing servo circuit 40 may be conventional ones used in the astigmatic method.

The present embodiment of the optical pickup device can be moved in a radial direction of the optical disk 100 as a whole under control of a conventional feed servo-mechanism. Moreover, an output power of the laser beam of the semiconductor laser 51 can be controlled by a conventional automatic power control (APC).

An operation of the present embodiment of the optical pickup device is described hereunder.

First, the laser beam radiated from the semiconductor laser 51 is shaped by the collimator lens 52 into parallel rays and then passes through the ultra-resolving prism 10. At this time, the shielding portion 13 of the prism 10 decreases the light intensity of the shaped laser beam 200 around its cross sectional center. Accordingly, the prism 10 causes ultra-resolution of the laser beam 200 by its light reducing effects, as shown in FIGS. 2(a) and 2(c). Thus, the beam spots transmitted through the beam splitter 54 and converged on the signal surface of the disk 100 via the objective lens 57 are composed of the main lobe 201 and the side lobes 202 and 203, as shown in FIGS. 2(b), 3(a)–3(c) and 5. The spot size (beam waist diameter) of the main lobe 201 is smaller than the spot size of a normal laser beam that uses no ultra-resolution. Moreover, the side lobes 202 and 203 are oppositely positioned from the track center 101 by a quarter track pitch, by adjusting the positional relationship of the peak of the light shielding portion 13 of the prism 10 to the track center 101 of the disk 100.

The laser beams 201, 202 and 203 converged on the signal surface of the disk 100 are then reflected by the disk 100. The reflected laser beams are made parallel as they pass through the objective lens 57 and reflected thereafter by the beam splitter 54 toward the half mirror 15. Such a reflected laser beam is converged by the converging lens 71, and part of the converged laser beam is reflected by the plane parallel plate half mirror 15 and converged on the first optical detector 20.

In the first detector 20, the first detecting element 21 receives the main lobe 201 that contains the reproduced signal components corresponding to a line of pits on the track of the disk 100, thereby detecting the reproduced signals. The detected reproduced signals are inputted and processed in the signal reproducing circuit 26, so that information of the disk 100 is outputted and reproduced from an output device. Here, all of the main lobe 201 is advantageously converged on the element 21 without any cut by a slit or the like as in the known device, so that the signal to noise ratio (S/N) of the reproduced signals is very good.

The second and third detecting elements 22 and 23, respectively, receive the side lobes 202 and 203 that contain the tracking error signal components, thereby detecting the tracking error signals according to the state of the side lobes 202 and 203. The detected tracking error signals are inputted in the tracking servo circuit 27 and the tracking servo circuit 27 controls the actuator 29 to position the objective lens 57 such that the main lobe 201 follows the track center 101 of the disk 100. In processing the tracking error signals, the spots of the side lobes 202 and 203 are separated from each other, in the opposite direction about the track center 101 on the disk 100, as shown in FIG. 5. Therefore, it is possible to generate the tracking error signals by calculating the difference between the detected signals in the second and third detecting elements 22 and 23 through the tracking error detecting circuit in the tracking servo circuit 27.

On the other hand, the rest of the converged laser beam from the converging lens 71 is transmitted through the half mirror 15 and converged on the second optical detector 30. Here, the present embodiment utilizes the half mirror 15 as an astigmatic element instead of a cylindrical lens, since the plane parallel plate half mirror 15 generates astigmatism when disposed in the converged laser beam. Such an astigmatic operation of the half mirror is disclosed in U.S. Pat. Nos. 4,358,200, 4,779,255 and 4,967,921, for example. In the second detector 30, the first to fourth detecting elements 31–34 receive the main lobe 201 that contains the focusing error signal components, thereby detecting the focusing error signals according to the state of the main lobe 201.

As described above, with the present embodiment of the optical pickup device, no part of the main lobe 201, which is effective as the reproduced signal, is cut by a slit or the like, before it reaches the first detector 20. Thus, it is possible to prevent deterioration of the S/N ratio due to a reduced quantity of light occurring when a slit is used. Moreover, it is unnecessary to adjust the position of the slit as in the known devices. Furthermore, it is possible to eliminate crosstalk noise or interference between codes. In addition, the tracking error signals can be obtained by a simple structure by orienting the peak of the light shielding portion 13 of the prism 10 at a fixed angle to the track center 101. Moreover, since the first detector 20 has the first detecting element 21, as an information reproducing element, and the second and third detecting elements 22 and 23, as tracking error generating elements, into one body, structure of the optical system can be simplified.

While, in the illustrative embodiment, the ultra-resolving prism 10 is used as the light reducing means, the light reducing means may be constituted by a band shaped light shielding plate as in the known device. In this case, the light shielding plate is rotated and adjusted, in a plane perpendicular to the optical axis of the laser beam, so as to orient its longitudinal axis at a predetermined angle to the track center 101. Thus, it is possible to provide the tracking error signals as in the above embodiment. Still, when using the ultra-resolving prism 10, the shaped laser beam 200 is separated from the center line by the light shielding portion 13, so that the light quantity of the center part does not decrease, contrary to the band shield plate, thereby preventing energy loss of the laser beam. Here, when using the light shielding plate, if the width of the light shielding plate is changed, the distance between the side lobes 202 and 203 can be changed accordingly. On the other hand, in case of the prism 10, the sizes of the main lobe 201 and the side lobes 202 and 203, the distance between the side lobes 202 and 203, etc., can be changed by changing the crossing angle of the two glass plates 11 and 12. While the ultra-resolving prism 10 is made of two glass plates 11 and 12, it may be made of another material, e.g. a synthetic resin material.

Generally, while the semiconductor laser is used as the laser source 51, other laser sources such as a gas laser may be used according to an object. Moreover, a half mirror may be used instead of the beam splitter 54. Furthermore, the second optical detector 30 may be structured such that it also detects information signals of the optical disk 100.

The preferred embodiments described herein are therefore illustrative and not restrictive, the scope of the invention being indicated in the appended claims and all variations which come within the meaning of the claims are intended to be embraced therein.

What is claimed is:

1. An optical pickup device comprising:

a laser source;

a collimator lens shaping a laser beam radiated from the laser source;

an objective lens converging the shaped laser beam from the collimator lens on an optical disk surface;

a light reducing means, disposed between the laser source and the objective lens, for reducing light intensity of the shaped laser beam at around its cross sectional center so as to separate the laser beam converged on the optical disk surface into a main lobe and a pair of side lobes placed at both sides of the main lobe, the light reducing means being positioned so that the objective lens converges the main lobe therefrom on a track composed of a line of pits while converging the side lobes at positions oppositely shifted from a track center by a predetermined amount in a track pitch direction;

a beam splitter disposed between the light reducing means and the objective lens, the beam splitter transmitting and directing the laser beam from the light reducing means toward the objective lens while reflecting the laser beam that is reflected from the optical disk and transmitted through the objective lens toward a first predefined direction;

a converging lens disposed on an optical axis of the laser beam reflected by the beam splitter;

a plane parallel plate half mirror disposed on the optical axis of the laser beam converged by the converging lens while being inclined to the optical axis, the plane parallel plate half mirror reflecting part of the converged laser beam to a second predefined direction and transmitting therethrough rest of the converged laser beam to a third predefined direction;

a first optical detector disposed at a converging point of the laser beam, in the second direction, of the converging lens so as to receive the reflected laser beam through the plane parallel plate half mirror, the first optical detector including first, second and third detecting elements, the first detecting element receiving the main lobe in the reflected laser beam so as to detect signals corresponding to information stored in the optical disk, the second and third detecting elements respectively receiving the side lobes in the reflected laser beam so as to detect tracking error signals; and a second optical detector disposed at a converging point of the laser beam, in the third direction, of the converging lens so as to receive the transmitted laser beam through the plane parallel plate half mirror, the second optical detector receiving the main lobe in the transmitted laser beam so as to detect focusing error signals.

* * * * *